US008898518B2

(12) United States Patent
Agesen et al.

(10) Patent No.: US 8,898,518 B2
(45) Date of Patent: *Nov. 25, 2014

(54) METHOD AND SYSTEM FOR ENABLING CHECKPOINTING FAULT TOLERANCE ACROSS REMOTE VIRTUAL MACHINES

(75) Inventors: Ole Agesen, Menlo Park, CA (US); Raviprasad Mummidi, Mountain View, CA (US); Pratap Subrahmanyam, Saratoga, CA (US)

(73) Assignee: VMware, Inc., Palo Alto, CA (US)

(*) Notice: Subject to any disclaimer, the term of this patent is extended or adjusted under 35 U.S.C. 154(b) by 182 days.

This patent is subject to a terminal disclaimer.

(21) Appl. No.: 13/450,249

(22) Filed: Apr. 18, 2012

(65) Prior Publication Data

US 2012/0204061 A1 Aug. 9, 2012

Related U.S. Application Data

(63) Continuation-in-part of application No. 12/781,875, filed on May 18, 2010, now Pat. No. 8,171,338.

(51) Int. Cl.
 *G06F 11/00* (2006.01)
 *G06F 11/20* (2006.01)
(52) U.S. Cl.
 CPC ........ *G06F 11/2097* (2013.01); *G06F 11/2038* (2013.01); *G06F 11/2046* (2013.01); *G06F 2201/815* (2013.01)
 USPC .............................................. 714/13; 714/4.11
(58) Field of Classification Search
 CPC ............ G06F 11/2097; G06F 11/2043; G06F 11/2041; G06F 11/2038; G06F 11/2046
 See application file for complete search history.

(56) References Cited

U.S. PATENT DOCUMENTS

| 6,073,222 A | 6/2000 | Ohran |
| 7,103,797 B1 | 9/2006 | Wahl et al. |

(Continued)

FOREIGN PATENT DOCUMENTS

| EP | 0097256 | 1/1984 |
| WO | 0109503 | 12/2001 |
| WO | 0195093 | 12/2001 |
| WO | 2011146645 | 11/2011 |

OTHER PUBLICATIONS

Notification of Transmittal of the International Search Report and the Written Opinion of the International Searching Authority, or the Declaration, International Search Report and Written Opinion of the International Searching Authority, International Patent Application No. PCT/US2011/037032, European Patent Office mailed Oct. 21, 2011.

(Continued)

*Primary Examiner* — Christopher McCarthy

(57) ABSTRACT

A checkpointing fault tolerance network architecture enables a backup computer system to be remotely located from a primary computer system. An intermediary computer system is situated between the primary computer system and the backup computer system to manage the transmission of checkpoint information to the backup VM in an efficient manner. The intermediary computer system is networked to the primary VM through a first connection and is networked to the backup VM through a second connection. The intermediary computer system identifies updated data corresponding to memory pages that have been least recently modified by the primary VM and transmits such updated data to the backup VM through the first connection. In such manner, the intermediary computer system holds back updated data corresponding to more recently modified memory pages, since such memory pages may be more likely to be updated again in the future.

20 Claims, 3 Drawing Sheets

(56) References Cited

U.S. PATENT DOCUMENTS

| | | | |
|---|---|---|---|
| 7,203,732 B2* | 4/2007 | McCabe et al. | 709/217 |
| 7,296,125 B2 | 11/2007 | Ohran | |
| 7,398,366 B2 | 7/2008 | Ohran | |
| 7,484,208 B1* | 1/2009 | Nelson | 718/1 |
| 7,779,295 B1* | 8/2010 | Shah et al. | 714/6.32 |
| 7,900,006 B2 | 3/2011 | Nagaraj | |
| 8,099,627 B1* | 1/2012 | Shah et al. | 714/16 |
| 8,171,338 B2 | 5/2012 | Agesen et al. | |
| 8,554,900 B2* | 10/2013 | Nelson | 709/223 |
| 2005/0132250 A1* | 6/2005 | Hansen et al. | 714/5 |
| 2007/0168518 A1 | 7/2007 | McCabe et al. | |
| 2009/0217085 A1 | 8/2009 | Van Riel et al. | |
| 2013/0067277 A1 | 3/2013 | Mummidi | |
| 2013/0097120 A1 | 4/2013 | Mummidi | |
| 2013/0246355 A1* | 9/2013 | Nelson et al. | 707/625 |

OTHER PUBLICATIONS

Non-final Office Action in U.S. Appl. No. 13/670,319, Mailed Date: Dec. 17, 2013, 13 Pages.

Non-final Office Action in U.S. Appl. No. 13/712,693, Mailed Date: Dec. 17, 2013, 12 Pages.

Non-final Office Action in U.S. Appl. No. 12/781,875, Mailed Date: Jul. 6, 2011, 5 Pages.

Notice of Allowance in U.S. Appl. No. 12/781,875, Mailed Date: Dec. 30, 2011, 5 Pages.

Final Office Action in U.S. Appl. No. 13/670,319, Mailed Date: May 2, 2014, 9 Pages.

Final Office Action in U.S. Appl. No. 13/712,693, Mailed Date: May 2, 2014, 12 Pages.

* cited by examiner

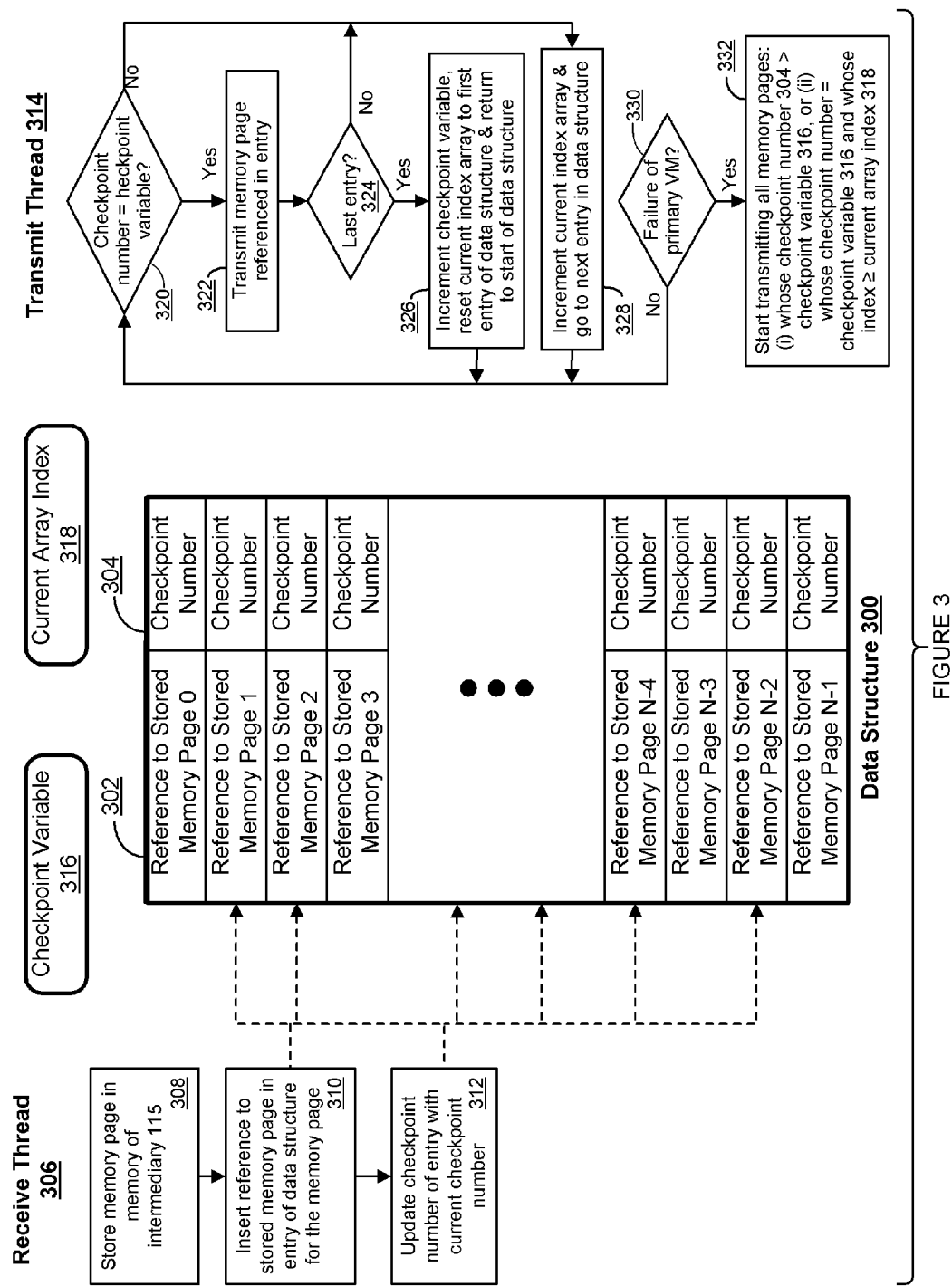

METHOD AND SYSTEM FOR ENABLING CHECKPOINTING FAULT TOLERANCE ACROSS REMOTE VIRTUAL MACHINES

CROSS REFERENCE TO RELATED APPLICATIONS

This application is a continuation-in-part of the U.S. patent application Ser. No. 12/781,875 filed on Mar. 18, 2010, entitled "Method and System for Enabling Checkpointing Fault Tolerance Across Remote Virtual Machines", which issued as U.S. Pat. No. 8,171,338.

BACKGROUND

As large-scale enterprises continue to adopt virtualization platforms as the foundation of their data centers, virtual machine (VM) fault tolerance has become an increasingly important feature to be provided by virtualization platform providers. Because a single host server in a virtualized data center can support multiple VMs, failure of that host server can bring down a multitude of services that were provided by the different VMs running on the failed host server. As such, virtualization platforms need to provide a mechanism to quickly resurrect a failed VM on a different host server so that the enterprise can maintain the quality of its service.

Currently, providing fault tolerance for a primary VM is typically achieved by providing a backup VM that runs on a server residing in a different "fault domain" from the server of the primary virtual machine. A fault domain can generally be described as a set of host servers in a data center (or data centers) that share a number of specified attributes and/or characteristics that results in a higher probability of failure of host servers in the fault domain upon a failure of one of the host servers in the fault domain. The attributes and/or characteristics utilized by an enterprise to define its data center fault domains depend upon the type of disasters and the level of recovery that the enterprises desire to achieve. For example, an enterprise may choose to define its fault domains based upon the physical proximity of host servers (storage rack location, geographic locations, etc.), the dependency of such servers on shared hardware (networked storage, power sources, physical connections, etc.) or software technologies (shared file systems, etc.), and the like. A well-constructed fault domain minimizes the correlation of a failure of a VM in one fault domain with the failure of another VM in a different fault domain.

VM fault tolerance may be provided using deterministic replay, checkpointing, or a hybrid of the two, which is disclosed in U.S. patent application Ser. No. 12/259,762, filed on Aug. 28, 2008, the entire contents of which are incorporated by reference herein. With replay techniques, essential portions of a primary VM's instruction stream (e.g., non-deterministic events within the primary VM's instruction stream) are captured in real-time (e.g., by a hypervisor layer or virtual machine monitor component of the primary VM) and transmitted to a backup VM (e.g., presumably located in a different fault domain) to "replay" the primary VM's execution in a synchronized fashion. If the primary VM fails, the backup VM can then take over without discernable loss of time. While replay techniques provide a robust fault tolerance solution with fast recovery times, they are less viable, for example, when non-deterministic events become more frequent or more difficult to identify within instruction streams, as is the case with virtual machines that support SMP (symmetric multiprocessing) architectures with multiple virtual CPUs.

In contrast to replay techniques, checkpointing based fault tolerance techniques are more flexible in their capabilities to support a variety of virtual architectures, including SMP-based virtual machines. Techniques for generating and using checkpoints in a virtual computer system are disclosed in U.S. Pat. No. 7,529,897, the entire contents of which are incorporated by reference herein. With checkpointing, the primary VM is periodically stunned (i.e., execution is temporarily halted) during the course of execution (each such stun period referred to as a "checkpoint") to determine any modifications made to the state of the primary VM since a prior checkpoint. Once such modifications are determined, they are transmitted to the backup VM which is then able to merge the modifications into its current state, thereby reflecting an accurate state of the primary VM at the time of the checkpoint. Only upon notification of a failure of the primary VM does the backup VM begin running, by loading the stored state of the primary VM into its own execution state. However, due to the potentially large size of checkpoint information (e.g., multiple gigabytes) in a transmitted state and the need to stun the primary VM at periodic checkpoints to transmit such state to the backup VM, the backup VM must be networked to the primary VM with sufficiently high bandwidth such that the stun period is not prolonged by network bandwidth limitations. This constraint currently restricts the ability to locate backup VMs in locations that are geographically distant from the primary VM or otherwise in a manner in which backup VMs are connected to primary VMs using network connections having insufficient bandwidth capacity to effectively transmit checkpoint information.

SUMMARY

One or more embodiments of the present invention enable a backup VM that receives checkpointing information to be remotely located from a primary VM. Such embodiments situate an intermediary computer system between the primary VM and the backup VM to manage the transmission of checkpoint information to the backup VM in an efficient manner. The intermediary computer system is networked to the primary VM through a first connection and is networked to the backup VM through a second connection. During each checkpoint, the intermediary computer system receives and stores updated data from the primary VM that corresponds to memory pages in the state of the primary VM that have been modified since a previous checkpoint. The intermediary computer system continuously identifies updated data corresponding to memory pages that have been least recently modified by the primary VM and transmits such updated data to the backup VM. In such manner, the intermediary computer system economizes the checkpointing process, holding back updated data corresponding to more recently modified memory pages, since such memory pages are more likely to be updated again in the future. In one embodiment, the intermediary computer system resides in a fault domain distinct from the fault domain of the primary VM such that failure of the intermediary computer system is not correlated with failure of the primary VM.

The method comprises the step of periodically receiving, at the intermediary computer system, checkpoint information packets from the primary computer system, continuously determining whether each copy of memory pages of the primary computer system stored at the intermediary computer system is a copy of a memory page that has been least recently updated by the primary computer system and has not been transmitted to the backup computer system, and transmitting updated data in each copy of each memory page determined to be a least recently updated memory page to the backup computer system. In this method, each checkpoint information packet received at the intermediary computer system comprises updated data corresponding to memory pages of the primary computer system that have been modified since a previously received checkpoint information packet.

In one implementation of the method, the connection from the primary computer system to the intermediary computer system is more economical than the connection from the intermediary computer system to the backup computer system. That is, the usage costs for transmissions via the second connection are greater than those of the first connection. In this implementation, the preference toward transmitting the less recently updated memory pages achieves a cost effective approach. In another implementation, the connection from the primary computer system to the intermediary is a higher bandwidth connection than that from the intermediary to the backup computer system, with the introduction of the intermediary being motivated by efficiently utilizing the more limited bandwidth to the backup computer system.

BRIEF DESCRIPTION OF THE DRAWINGS

FIG. 3 depicts a data structure for transmitting cold memory pages at an intermediary computer system.

DETAILED DESCRIPTION

Figure 1A:
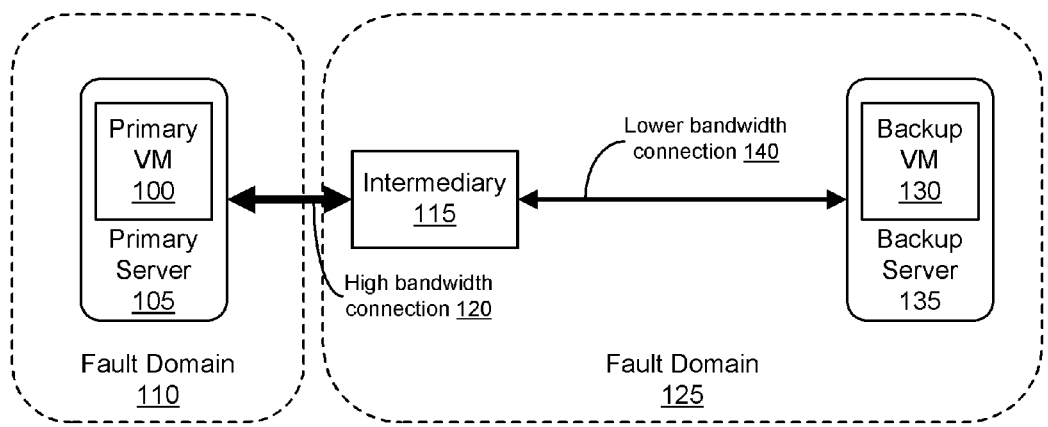
FIG. 1A depicts a block diagram of an embodiment of a network architecture for a primary and backup virtual machine using an intermediary computer system.

FIG. 1A depicts a block diagram of an embodiment of a network architecture for a primary and backup virtual machine using an intermediary computer system. A primary VM 100 resides on a primary server 105 in a fault domain 110 of a data center. One example of a primary server 105 that supports virtual machines is a server that runs the VMware ESX® hypervisor product, which is commercially available from VMware, Inc. of Palo Alto, Calif. (although it should be recognized that any virtualization technologies may be used consistent with the teachings herein, including Xen®, Microsoft Hyper-V and the like).

In the description that follows, the focus will be upon the embodiment in which a bandwidth concern is at least one motivation for configuring an intermediary computer system 115 to preferentially pass less recently updated memory pages. However, there are motivations for utilizing the method even where bandwidth limitations is not an issue.

An intermediary computer system 115 (hereinafter, "intermediary") is situated in close enough proximity to server 105 such that a high bandwidth connection 120 can be placed between server 105 and intermediary 115. High bandwidth connection 120, as described further below, provides sufficient bandwidth capacity to support the transmission of checkpoint information between primary VM 100 and intermediary 115 during primary VM's 100 execution. For example, in one embodiment, high bandwidth connection 120 provides sufficient bandwidth capacity for intermediary 115 to efficiently receive checkpoint information from the primary VM 100 at a rate of 50 to 100 times per second, with each set of checkpoint information potentially comprising multiple gigabytes of data. Although intermediary 115 is located at a sufficient physical proximity to primary VM 100 to enable high bandwidth connection 120, intermediary 115 is also located in a different fault domain 125 than fault domain 110 of primary VM 100, such that a failure of primary VM 100 (or server 105) is not correlated to (or otherwise does not have a significant correlation to) a failure of intermediary 115. As further depicted in FIG. 1A, a backup VM 130 resides on a backup server 135 that shares fault domain 125 with intermediary 115. A lower bandwidth connection 140 between intermediary 115 and backup VM 130 provides flexibility to situate backup VM 130 in a location geographically remote from intermediary 115 and/or primary VM 100.

Figure 1B:
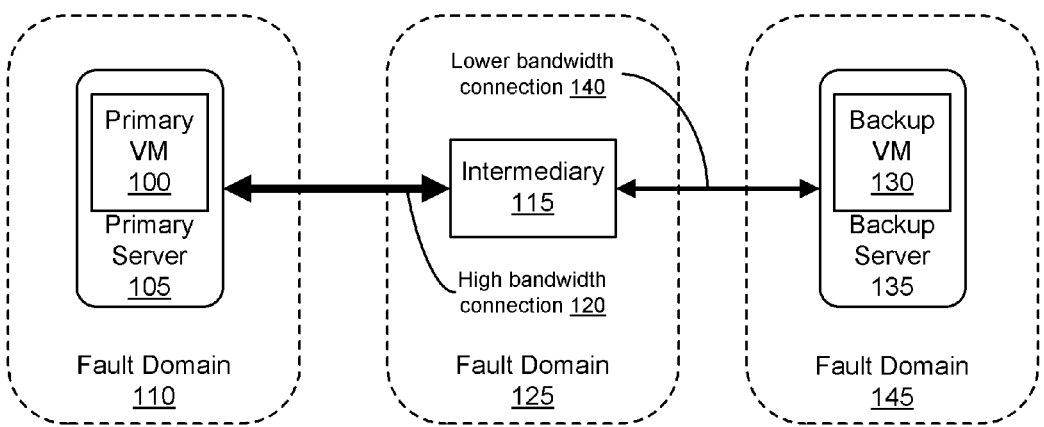
FIG. 1B depicts a block diagram of a second embodiment of a network architecture for a primary and backup virtual machine using an intermediary computer system.

FIG. 1B depicts a block diagram of a second embodiment of a network architecture for a primary and backup virtual machine using a intermediary computer system. As depicted in FIG. 1B, intermediary 115 and backup VM 130 on backup server 135 reside in different fault domains 125 and 145, respectively. For example, in one embodiment, primary VM 100 resides on blade primary server 105 which also comprises fault domain 110. Intermediary 115 is a second blade server utilizing the same chassis as blade primary server 105 but comprises a different fault domain 125. Intermediary 115 may be placed on top of the chassis, for example, to protect against flood damage that may affect blade primary server 105 which is placed on the bottom of the chassis (e.g., such that blade primary server 105 and the intermediary 115 exhibit different failure characteristics resulting in different fault domains 110 and 125, respectively). High bandwidth connection 120, in such an embodiment, may be facilitated by the PCI-e backplane of the chassis. Backup VM 130 on backup server 135 may be located in geographically remote location in this embodiment. For example, if primary VM 100 and intermediary 115 are located in a data center in Palo Alto, Calif., backup VM 130 may be located in a different data center in Boston, Mass. In another embodiment, intermediary 115 may be located at the edge of a subnet, for example, as a modified NIC or a router or other edge device, for consolidation in management. Alternatively, the functionality of intermediary 115 may be implemented within primary server 105 itself, for example, set in a relatively more reliable part of the processor or motherboard of primary server 105.

Figure 2:
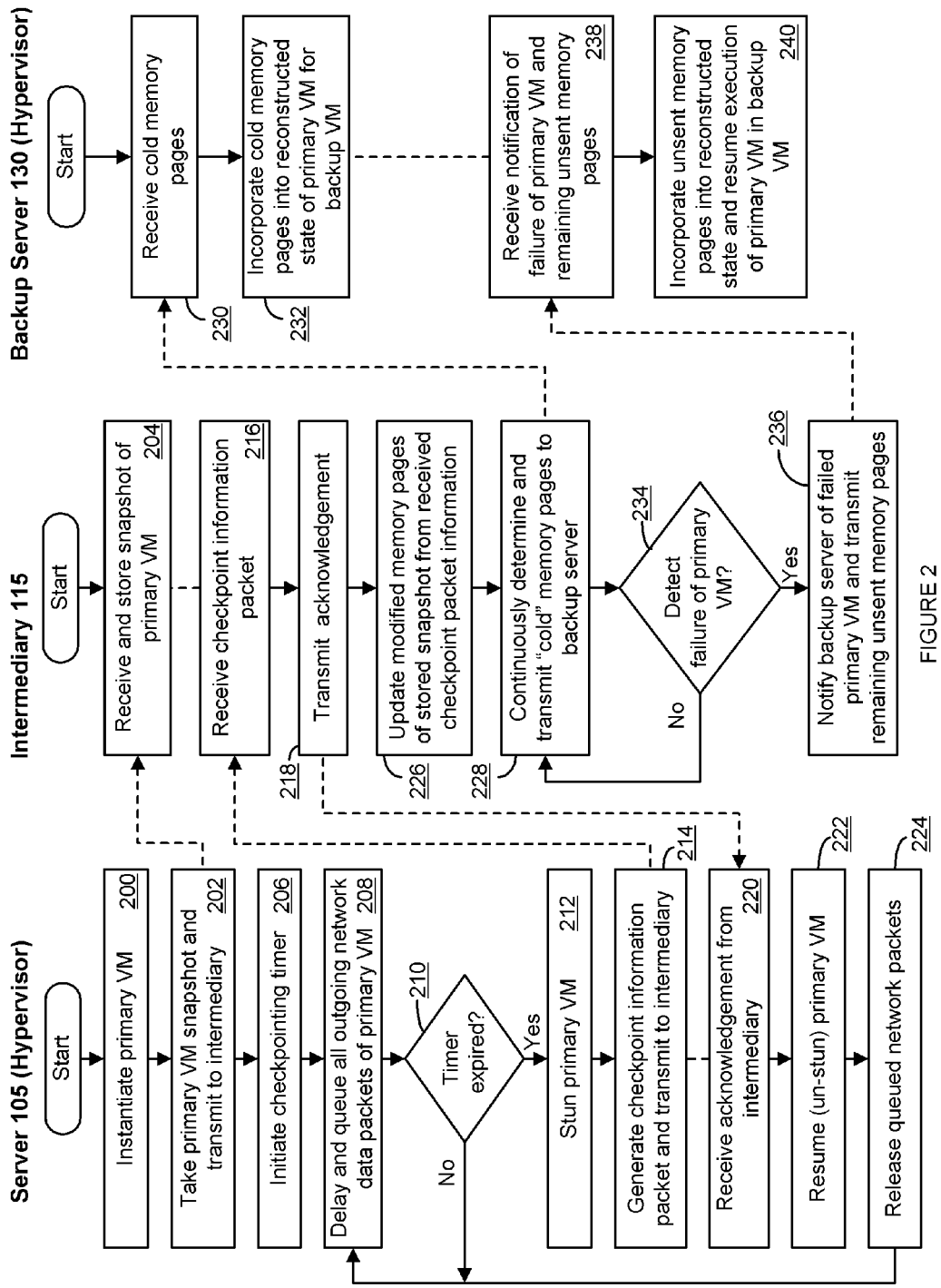
FIG. 2 depicts a flow diagram for transmitting an updated state of a primary virtual machine to a backup virtual machine using an intermediary computer system.

FIG. 2 depicts a flow diagram for transmitting an updated state of a primary virtual machine to a backup virtual machine using an intermediary computer system. In one embodiment, primary server 105, which hosts primary VM 100, includes a checkpointing module (or other checkpointing functionality) in its hypervisor. As further detailed below, such a checkpointing module transmits checkpoint information packets over high bandwidth connection 120 to intermediary 115 at each checkpoint. Each checkpoint information packet includes information reflecting changes in the state of primary VM's 100 memory (and emulated devices, in certain embodiments) from the previously transmitted checkpoint information packet. In one embodiment, transmission of checkpoint information packets by the hypervisor of primary server 105 occurs, for example, approximately at a rate of 50 to 100 times per second.

In step 200, the hypervisor of primary server 105 instantiates primary VM 100. In step 202, the hypervisor of primary server 105 takes an initial snapshot of the state of primary VM 100 and transmits the snapshot to intermediary 115. The initial snapshot comprises a plurality of memory pages that make up the state of memory (and, in certain embodiments, the state of emulated devices) of primary VM 100. For example, in one embodiment, each memory page has a size of 4 KB such that a primary VM 100 configured with a virtual RAM of 4 GB would have an initial snapshot size of approximately 1 million memory pages. In an embodiment utilizing VMware's ESX virtualization platform, VMware's VMotion technology can be used to create and transmit such an initial snapshot. In step 204, intermediary 115 receives and stores the initial snapshot. In step 206, the hypervisor of primary VM 100 initiates a timer to periodically trigger the initiation of checkpoints to generate checkpoint information packets (e.g., 50 to 100 times a second, etc.). Prior to the expiration of the timer, in step 208, the hypervisor delays and queues any and all outbound network packets generated by primary VM 100.

Once the timer expires in step 210, the hypervisor initiates a checkpoint by stunning primary VM 100 (i.e., freezes its execution state) in step 212 and generates a checkpoint information packet reflecting the current state of stunned primary VM 100 and transmits the checkpoint information packet to intermediary 115 in step 214. In one embodiment, the checkpoint information packet comprises a subset of the memory pages (or portions thereof) of the initial snapshot that have been updated during execution of primary VM 100 since a previously transmitted checkpoint information packet (or since the initial snapshot for a first checkpoint information packet). It should be recognized that a variety of techniques may be utilized to identify updated memory pages in primary VM 100 including, for example, leveraging hardware that may be available on primary server 105 for detecting such modified pages through hardware controlled dirty bits of page tables and page directories used for memory virtualization. In step 216, intermediary 115 successfully receives the transmitted checkpoint information packet and in step 218 transmits an acknowledgement of successful receipt back to primary server 105. Once the hypervisor of primary server 105 receives the transmitted acknowledgement in step 220, the hypervisor resumes execution of primary VM 100 in step 222 and releases all the queued up network packets (from step 208) in step 224 before returning back to step 208. Delaying and queuing the outbound network packets in step 208 and releasing them only after receiving acknowledgement from intermediary 115 of receipt of a checkpoint information packet in step 220 ensures that restoration of primary VM 100 by backup server 135 upon a failure of primary VM 100 is based on a state of primary VM 100 that can properly resume network communications with external entities (i.e., re-transmit outbound network packets since the recovered state without confusing recipients, re-receive inbound network packets that it is expecting, etc.).

Meanwhile, in step 226, intermediary 115 updates its stored snapshot of the state of primary VM 100 with the updated memory pages (or portions thereof) in the checkpoint information packet received in step 216. Simultaneously with its continuous receipt of checkpoint information packets and updates to its stored snapshot of the state of primary VM 100 in steps 216 and 226, intermediary 115 also continuously (e.g., via a separate running process or thread, etc.) determines and transmits those received memory pages that have been modified less or least recently by primary VM 100 to backup server 135 in step 228 (such less or least recently modified memory pages referred to herein as "cold" memory pages). In step 230, the hypervisor of backup server 135 receives these cold memory pages and, in step 232, incorporates the cold memory pages into its reconstructed state of primary VM 100 for backup VM 130. It should be recognized that the reconstructed state of primary VM 100 maintained by backup VM 130 may not necessarily reflect a completed state of any particular past "checkpointed" state of primary VM 100 since intermediary 115, in step 228, only transmits "cold" memory pages to backup server 135. That is, memory pages that are considered "hotter" by intermediary 115 (i.e., modified more recently), even if needed to provide backup server 135 a complete set of memory pages reflecting the state of primary VM 100 at a particular checkpoint, are held back and not transmitted to backup server 135. Holding back such hotter memory pages conserves the limited bandwidth capacity of lower bandwidth connection 140 between intermediary 115 and backup server 135, based upon a presumption that the hotter memory pages will be again modified before backup VM 130 needs to take any action due to a failure of primary VM 100.

If, in step 234, intermediary 115 detects a failure of primary VM 100 (or is otherwise notified thereof), then in step 236, intermediary 115 notifies backup server 135 of the failure of primary VM 100 and transmits any unsent memory pages of its stored snapshot of primary VM 100 to backup server 135. In step 238, backup server 135 receives notification of the failure of primary VM 100 and the memory pages and, in step 240, incorporates the received memory pages into its reconstructed state for primary VM 100 and resumes execution of primary VM 100 as backup VM 130.

FIG. 3 depicts a data structure for transmitting cold memory pages at an intermediary computer system. In one embodiment, intermediary 115, in contrast to primary server 105 and backup server 135 which run virtualization platforms, is a non-virtualized computer system running one or more processes (e.g., or threads, etc.) that receives checkpoint information packets from primary server 105 and transmits memory pages to backup server 135 as based upon information maintained in a data structure 300 (although it should be recognized that intermediary 115 may also be implemented in a virtual machine in alternative embodiments). As depicted in FIG. 3, data structure 300 is an array of entries that each correspond to one of memory pages 0 to N−1 that comprise the initial snapshot of primary VM 100 (see, e.g., step 202 of FIG. 2). Each such entry comprises a reference field 302 (e.g., address pointer) to a location in intermediary's 115 memory that stores a copy of the memory page received from primary server 105 and a checkpoint number field 304 indicating the checkpoint (represented as an epoch or chronological number) in which intermediary 115 received its current copy of the memory page.

A thread, referred to as receive thread 306, manages the receipt of memory pages of primary VM 100 from primary server 105 (e.g., from the initial snapshot in step 202 as well as from each subsequent checkpoint information packet in step 214). In step 308, for each memory page received from primary server 105 via high bandwidth connection 120, receive thread 306 stores the memory page in the memory of intermediary 115. In step 310, receive thread 306 inserts the storage address of the stored memory page into the reference field 302 of the entry in data structure 300 corresponding to the received memory page. In step 312, receive thread 306 updates the checkpoint number field 304 of the entry with the current checkpoint number.

A simultaneously running thread, referred to as transmit thread 314, manages the transmission of "cold" memory pages (e.g., least recently modified) to backup server 135 as described in step 228 of FIG. 2 (via low bandwidth connection 140). Transmit thread 314 maintains a checkpoint variable 316 indicating a checkpoint number that transmit thread 314 is currently operating upon as well as a current array index 318 that indicates the current entry in data structure 300 upon which transmission thread 314 is operating during its execution. Checkpoint variable 316 is initialized to zero (e.g., the value of checkpoint number field 304 in each entry of data structure 300 when such entry corresponds to the memory page received from the initial snapshot received in step 204 of FIG. 2) and current array index 318 is initialized to the index of the first entry of data structure 300 (e.g., index of zero). Transmit thread 314 begins with the first entry of data structure 300 (e.g., entry for memory page 0) and if such entry's checkpoint number field 304 matches checkpoint variable 316 in step 320, then in step 322, transmit thread 314 begins transmitting the memory page (i.e., such memory page being a "cold" memory page) referenced in the entry's reference field 302 to backup server 135 through lower bandwidth connection 140. In step 324, upon receiving an acknowledgment from backup server 135 of successful receipt of the memory page, transmit thread 314 determines whether current array index 318 represents the index of the last entry of data structure 300. If transmit thread 314 determines that current array index 318 represents the index of the last entry in data structure 300, then in step 326, transmit thread 314 increments checkpoint variable 316, resets current array index 318 to the index of the first entry of data structure 300 (e.g., index of zero), and returns to the beginning of data structure 300. Otherwise, transmit thread 314 increments current array index 318 and moves to the next entry in data structure 300 in step 328.

If, in step 330, transmit thread 314 receives notification of a failure of primary VM 100, then in step 332, transmit thread 314 traverses through data structure 300, transmitting memory pages referenced in each entry (a) whose checkpoint number 304 is greater than checkpoint variable 316, or (b) whose checkpoint number 304 equals checkpoint variable 316 and whose index is greater than or equal to current array index 318 (i.e., indicating that the memory page has not yet been transmitted to backup server 135). In one embodiment, upon receiving notification of a failure of primary VM 100 in step 330, transmit thread 314 begins to transmit the "hotter" memory pages first, by transmitting those memory pages having the highest values in their checkpoint number fields 304, in an effort to enable backup VM 130 to start execution prior to receiving all unsent memory pages in the snapshot, under a presumption, for example, that the hotter memory pages are more likely to be accessed during subsequent execution of backup VM 130 than colder memory pages.

It should be recognized that transmit thread 314 may traverse data structure 300 and transmit cold memory pages to backup server 135 at a significantly slower rate due to lower bandwidth connection 140 than the rate that receive thread 308 receives and updates memory pages at each checkpoint through high bandwidth connection 120. As such, the value of checkpoint variable 316 remains lower than the actual current checkpoint number of checkpoint information packets received by receive thread 306. By holding back hotter memory pages and transmitting cold memory pages, intermediary 115 thus reduces the possibility that the bandwidth capacity of lower bandwidth connection 140 will be wasted on transmission of memory pages that would likely be overwritten with updated data in the near future (i.e., fewer memory pages are transmitted by intermediary 115 than are received).

It should be recognized that data structure 300 and techniques described in FIG. 3 are merely exemplary and that a variety of alternative data structures and techniques that may be utilized to determine whether memory pages are "cold" (i.e., with a different conception of how "cold" may be defined or assessed). For example, in an alternative embodiment of FIG. 3 may include a transmission bit in each entry of data structure 300 which would indicate whether the memory page corresponding to the entry has already been transmitted to backup VM 130. Another alternative embodiment utilizes an array of entries indexed by memory pages of the primary VM's snapshot (similar to data structure 300), where each entry in the array comprises a reference to the stored memory page (similar to reference field 302) and a counter value. In such an embodiment, a receive thread increments the counter value for an entry each time a received checkpoint information packet includes a corresponding updated memory page. Simultaneously, a transmit thread continually cycles through the array and transmits memory pages corresponding to entries that have a pre-specified low counter value. Such an embodiment utilizes the concept of least frequently modified memory pages to define "cold" rather than least recently modified. Yet another alternative embodiment utilizes a data structure that maintains a list of checkpoint numbers for each memory page corresponding to the checkpoints in which such memory page was updated. Such a data structure provides flexibility to specify or define "cold" memory pages in a variety of ways, such as, for example, memory pages with the smallest list of checkpoint numbers or memory pages that have remained unchanged for a consecutive number of checkpoints (e.g., least frequently modified or least recently modified, etc.).

It should be recognized that various modifications and changes may be made to the specific embodiments described herein without departing from the broader spirit and scope of the invention as set forth in the appended claims. For example, while the foregoing discussions have focused on embodiments in which primary server 105 and intermediary 115 transmitting complete memory pages (if such memory page has been modified), it should be recognized that alternative embodiments may apply difference techniques or other compression techniques on memory pages at either or both of primary server 105 and intermediary 115 prior to their transmission. Such alternative embodiments may thus transmit only updated data corresponding to the memory pages rather than the complete memory pages themselves. Similarly, it should be recognized that although the foregoing embodiments have discussed a single intermediary 115, embodiments may incorporate multiple intermediaries, possible in different fault domains, such that probability of failure of all intermediaries is negligible. Additionally, while the foregoing embodiments have been generally described using primary and backup VMs, other primary and backup computer systems, including non-virtualized systems, may be used consistent with the teachings herein.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for transmitting an updated state of a primary computer system to a backup computer system through an intermediary computer system, the method comprising:
   receiving, at the intermediary computer system, checkpoint information packets from the primary computer system through a first network connection, wherein each checkpoint information packet comprises updated data corresponding to memory pages of the primary computer system that have been modified since a previously received checkpoint information packet;
   determining, by the intermediary computer system, whether each copy of memory pages of the primary computer system stored at the intermediary computer system is a copy of a memory page that has been least recently updated by the primary computer system and has not been transmitted to the backup computer system; and
   transmitting, by the intermediary computer system, updated data in each copy of each memory page determined to be a least recently updated memory page to the backup computer system through a second network connection.

2. The method of claim 1, further comprising the steps of:
   receiving notification of a failure of the primary computer system; and
   transmitting to the backup computer system through the second network connection updated data corresponding to each unsent memory page stored at the intermediary computer system.

3. The method of claim 2, wherein updated data corresponding to unsent memory pages that have been most recently modified by the primary computer system are transmitted first.

4. The method of claim 1, wherein the primary computer system resides in a first fault domain and the intermediary computer system resides in a second fault domain.

5. The method of claim 1, wherein the periodically receiving step is performed by a first thread running in the intermediary computer system and the determining and transmitting steps are performed by a second thread running in the intermediary computer system.

6. The method of claim 1, wherein the primary computer system is a server hosting a primary virtual machine and the backup computer system is a second server hosting a backup virtual machine.

7. The method of claim 1, wherein the intermediary computer system maintains an array of entries corresponding to each memory page of the primary computer system, wherein each entry of the array comprises a reference to a copy of the corresponding memory page stored in the intermediary computer system and a checkpoint number identifying a checkpoint at which the copy was received by the intermediary computer system.

8. The method of claim 7, wherein the continuously determining step further comprises the steps of:
   traversing the entries in the array to compare a current checkpoint variable with the checkpoint number of each entry of the array;
   transmitting updated data in the copy of the corresponding memory page stored in the intermediary computer system of an entry if the checkpoint number of the entry equals the current checkpoint variable;
   incrementing the current checkpoint variable after analyzing a last entry in the array; and
   returning to the beginning of the array.

9. A non-transitory computer-readable storage medium including instructions that, when executed by a processor of an intermediary computer system transmits an updated state of a primary computer system to a backup computer system, wherein the intermediary computer system is networked to the primary computer system through a first connection and is networked to the backup computer system through a second connection, by performing the steps of:
   receiving, by the intermediary computer system, checkpoint information packets from the primary computer system through the first connection, wherein each checkpoint information packet comprises updated data corresponding to memory pages of the primary computer system that have been modified since a previously received checkpoint information packet;

determining, by the intermediary computer system, whether each copy of memory pages of the primary computer system stored at the intermediary computer system is a copy of a memory page that has been least recently updated by the primary computer system and has not been transmitted to the backup computer system; and transmitting by the intermediary computer system updated data in each copy of each memory page determined to be a least recently updated memory page to the backup computer system through the second connection.

10. The non-transitory computer-readable storage medium of claim 9, wherein the processor of an intermediary computer system further performs the steps of:

receiving notification of a failure of the primary computer system; and transmitting to the backup computer system through the second connection updated data corresponding to each unsent memory page stored at the intermediary computer system.

11. The non-transitory computer-readable storage medium of claim 10, wherein updated data corresponding to unsent memory pages that have been most recently modified by the primary computer system are transmitted first.

12. The non-transitory computer-readable storage medium of claim 9, wherein the primary computer system resides in a first fault domain and the intermediary computer system resides in a second fault domain.

13. The non-transitory computer-readable storage medium of claim 9, wherein the receiving step is performed by a first thread running in the intermediary computer system and the determining and transmitting steps are performed by a second thread running in the intermediary computer system.

14. The non-transitory computer-readable storage medium of claim 9, wherein the primary computer system is a server hosting a primary virtual machine and the backup computer system is a second server hosting a backup virtual machine.

15. The non-transitory computer-readable storage medium of claim 9, wherein the intermediary computer system maintains an array of entries corresponding to each memory page of the primary computer system, wherein each entry of the array comprises a reference to a copy of the corresponding memory page stored in the intermediary computer system and a checkpoint number identifying a checkpoint at which the copy was received by the intermediary computer system.

16. The non-transitory computer-readable storage medium of claim 15, wherein the determining step further comprises the steps of:

traversing the entries in the array to compare a current checkpoint variable with the checkpoint number of each entry of the array;

transmitting updated data in the copy of the corresponding memory page stored in the intermediary computer system of an entry if the checkpoint number of the entry equals the current checkpoint variable;

incrementing the current checkpoint variable after analyzing a last entry in the array; and returning to the beginning of the array.

17. A computer system for transmitting an updated state of a primary computer system to a backup computer system, the computer system comprising:

a primary computer system residing in a first fault domain and transmitting checkpoint information packets comprising updated data corresponding to memory pages of the primary computer system modified since a previously transmitted checkpoint information packet; and an intermediary computer system residing in a second fault domain and connected to the primary computer system through a first connection, wherein the intermediary computer system receives the transmitted checkpoint information packets, determines whether the received transmitted checkpoint information packets contain updated data corresponding to least recently modified memory pages stored at the intermediary computer system, and transmits the updated data determined to correspond to least recently modified memory pages to a backup computer system through a second connection.

18. The computer system of claim 17, wherein the intermediary computer system further receives notification of a failure of the primary computer system and transmits to the backup computer system through the low bandwidth connection updated data corresponding to each unsent memory page stored at the intermediary computer system.

19. The computer system of claim 18, wherein the primary computer system is a server hosting a primary virtual machine and the backup computer system is a second server hosting a backup virtual machine.

20. The computer system of claim 17, wherein the intermediary computer system maintains an array of entries corresponding to each memory page of the primary computer system, wherein each entry of the array comprises a reference to a copy of the corresponding memory page stored in the intermediary computer system and a checkpoint number identifying a checkpoint at which the copy was received by the intermediary computer system.

* * * * *